N. A. ROSE.
PANCAKE IRON.
APPLICATION FILED JULY 11, 1921.

1,417,351.
Patented May 23, 1922.

Nancy Ann Rose INVENTOR

BY Victor J. Evans
ATTORNEY

WITNESS:

UNITED STATES PATENT OFFICE.

NANCY ANN ROSE, OF REPUBLIC, WASHINGTON.

PANCAKE IRON.

1,417,351. Specification of Letters Patent. Patented May 23, 1922.

Application filed July 11, 1921. Serial No. 483,844.

*To all whom it may concern:*

Be it known that I, NANCY ANN ROSE, a citizen of the United States, residing at Republic, in the county of Ferry and State of Washington, have invented new and useful Improvements in Pancake Irons, of which the following is a specification.

This invention relates to a cooking utensil, the principal object of the invention being to provide supporting legs for the utensil with means for adjusting the same so as to adjust the utensil in relation to the stove top or camp fire.

Another object of the invention is to provide a hand lever for adjusting the legs.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
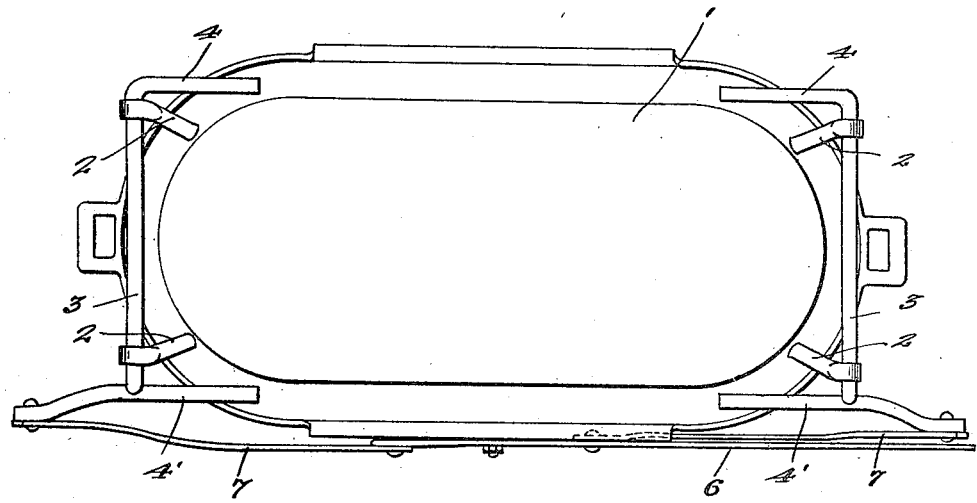
Figure 1 is a bottom plan view of the invention with the legs in folded position.
Figure 2:
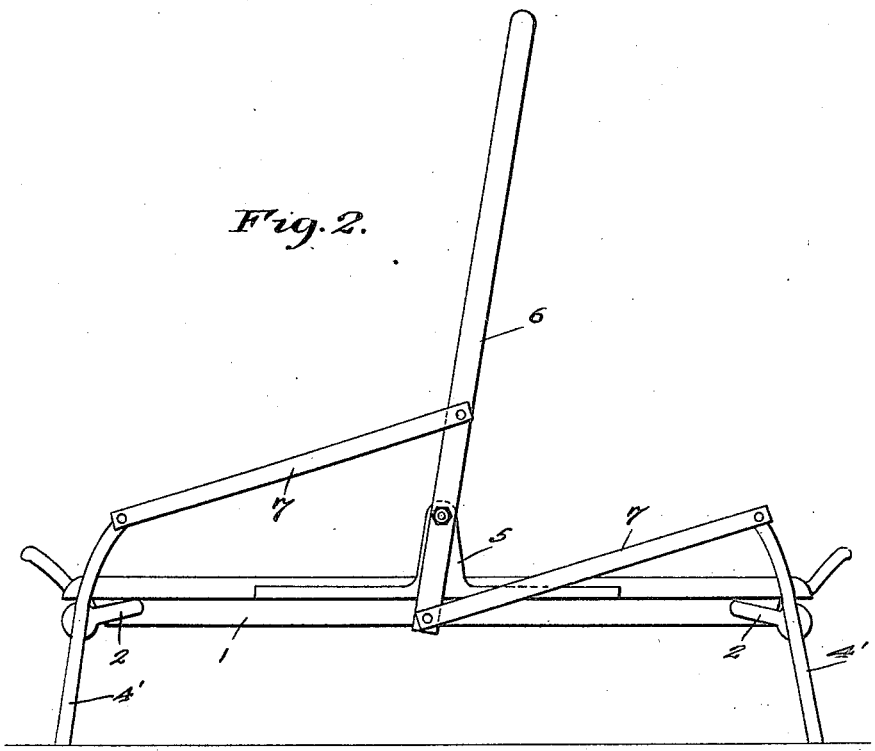
Figure 2 is a side view with the legs in extended position.

In these views 1 indicates the utensil which may be of any desired type, such as a pan for cooking pancakes and the like. At each corner of the utensil an inclined lug 2 is arranged, the outer end of which is provided with an eye. A cross bar 3 passes through the eyes of each pair of lugs and is rotatably supported thereby. One end of each bar is bent at right angles to provide a leg 4 and a leg 4' is secured to the other end of each bar intermediate its ends. A bracket 5 is connected with the utensil and a hand lever 6 is pivoted to the upper end of this bracket. Links 7 connect this lever with the upper ends of legs 4', one link being connected with the lever below its pivotal point and the other link being connected with the lever above its pivotal point.

It will thus be seen that by rocking the lever upon its pivot the legs will be moved towards and away from the bottom of the utensil so that the utensil can be adjusted vertically and thus moved towards or away from the stove top or the camp fire. This will permit the heating of the utensil and its contents to be controlled. For instance, if the pan becomes too hot, it is simply necessary to swing the legs downwardly to move the utensil away from the stove or fire and if necessary another utensil can be placed between the cooking utensil and the fire.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A cooking utensil having downwardly and outwardly extending lugs at its corners, a cross bar rotatably supported by each pair of lugs, legs connected with said cross bar, a bracket on the utensil, a lever pivoted to the bracket and links connecting the lever with one leg of each pair.

In testimony whereof I affix my signature.

NANCY ANN ROSE.